United States Patent [19]

Li

[11] Patent Number: 5,336,977

[45] Date of Patent: Aug. 9, 1994

[54] EMERGENCY LIGHTING DEVICE

[76] Inventor: Ming-Chun Li, No. 16, Lane 1, Tang-Pei Rd., Chiao-Tou Hsiang, Kaohsiung Hsien, Taiwan

[21] Appl. No.: 62,628

[22] Filed: May 18, 1993

[51] Int. Cl.$^5$ .................... H05B 37/02; H05B 39/04; H05B 41/36
[52] U.S. Cl. .................... 315/159; 315/344; 362/276; 307/66
[58] Field of Search ............ 315/134, 159, 344; 307/46, 48, 66; 340/522, 666; 362/276

[56] References Cited

U.S. PATENT DOCUMENTS

| | | | |
|---|---|---|---|
| 4,827,244 | 5/1989 | Bellavia et al. | 340/514 |
| 4,977,351 | 12/1990 | Bavaro et al. | 307/66 |
| 5,132,596 | 7/1992 | Walters et al. | 315/159 |

Primary Examiner—Robert J. Pascal
Assistant Examiner—Darius Gambino
Attorney, Agent, or Firm—Lowe, Price, LeBlanc & Becker

[57] ABSTRACT

An emergency lighting device includes a hollow casing, a magnetic field detecting unit, a lamp unit and a driving unit. The casing is positioned adjacent to an electric outlet. The magnetic field detecting unit is disposed inside the casing and detects the absence of a magnetic field from the electric outlet. The lamp unit is mounted operatively on the casing. The driving unit is disposed inside the casing and is connected electrically to the lamp unit and to the detecting unit. The driving unit includes a light-sensitive switch unit and is responsive to the detecting unit so as to activate the lamp unit only when the magnetic field from the electric outlet is absent and there is weak surrounding light.

3 Claims, 6 Drawing Sheets

EMERGENCY LIGHTING DEVICE

BACKGROUND OF THE INVENTION

1. Field Of The Invention

This invention relates to an emergency lighting device, more particularly to an emergency lighting device which is operable in the event of a power outage.

2. Description Of The Related Art

A conventional emergency lighting device is shown in FIG. 1. The conventional emergency lighting device includes a casing (10) which is fixed on a wall (20). A detecting unit (not shown) is installed inside the casing (10) and is connected electrically to a plug (11). The plug (11) is connected to an electric socket (19) so that the detecting unit can detect the presence of line power in the electric socket (19). When a power outage occurs, the detecting unit generates and transmits a signal to a driving unit (not shown) which is installed inside the casing and is connected electrically to the detecting unit. The driving unit enables a rechargeable battery (13) to supply the required power to activate the lamps (12). Referring to FIG. 2, a schematic block diagram of the circuit of the conventional emergency lighting device is shown. The detecting unit includes a rectifier unit (14) and a control unit (15). The plug (11) is connected electrically to the electric socket (19) (see FIG. 1) so that a sinusoidal alternating current line signal with a predetermined frequency, such as 110 V/60 HZ, 220 V/60 HZ, 100 V/50 HZ, etc., is transmitted to the rectifier unit (14). The rectifier unit (14) provides a direct current output via an output terminal (141). The output terminal (141) is connected electrically to the battery (13) and the control unit (15) so that the direct current output charges the battery (13) and is transmitted to the control unit (15). When the control unit (15) ceases to receive the direct current output from the rectifier unit (14), the control unit (15) enables the driving unit (16). The driving unit (16) is designed to be responsive to the intensity of the surrounding light so that the driving unit (16) permits the battery (13) to supply the required power to activate the lamps (12) via an output terminal (131) only upon the presence of weak surrounding light.

The drawback of the above-described conventional emergency lighting device is that a surge in the line signal may be transmitted from the electric socket to the lighting device immediately before the power outage occurs, thereby damaging the lighting device. Furthermore, the lighting device should be in constant connection with a socket (19), thereby limiting the place for installing the lighting device.

SUMMARY OF THE INVENTION

Therefore, the main object of the present invention is to provide an emergency lighting device which can overcome the aforementioned drawback that are associated with the conventional emergency light device.

According to this invention, an emergency lighting device includes a hollow casing, a magnetic field detecting unit, a lamp unit and a driving unit. The casing is positioned adjacent to an electric outlet. The magnetic field detecting unit is disposed inside the casing and detects the absence of a magnetic field from the electric outlet. The lamp unit is mounted operatively on the casing. The driving unit is disposed inside the casing and is connected electrically to the lamp unit and to the detecting unit. The driving unit includes a light-sensitive switch unit and is responsive to the detecting unit so as to activate the lamp unit only when the magnetic field from the electric outlet is absent and there is weak surrounding light.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
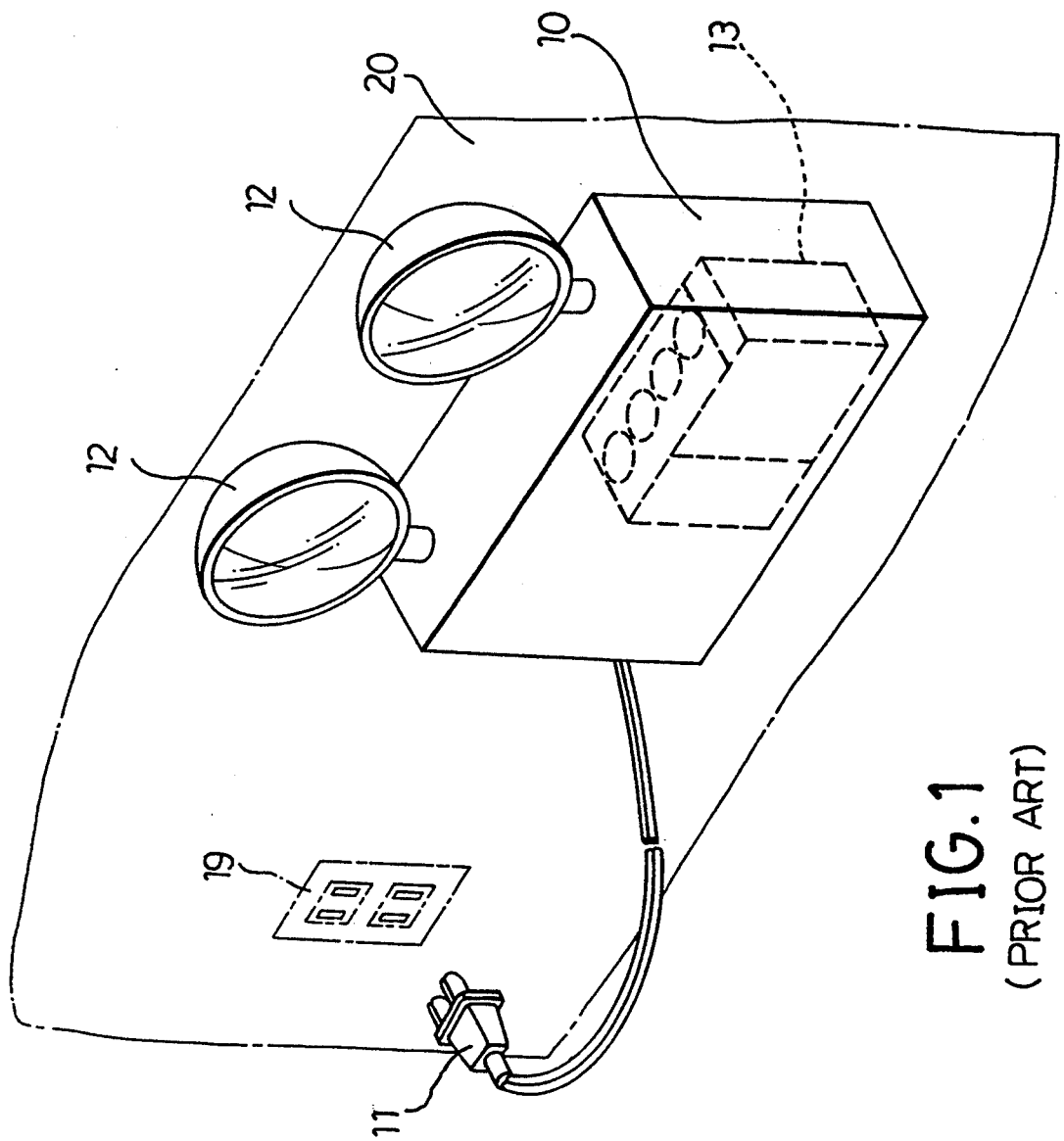
FIG. 1 is a perspective view showing a conventional emergency lighting device.
Figure 2:
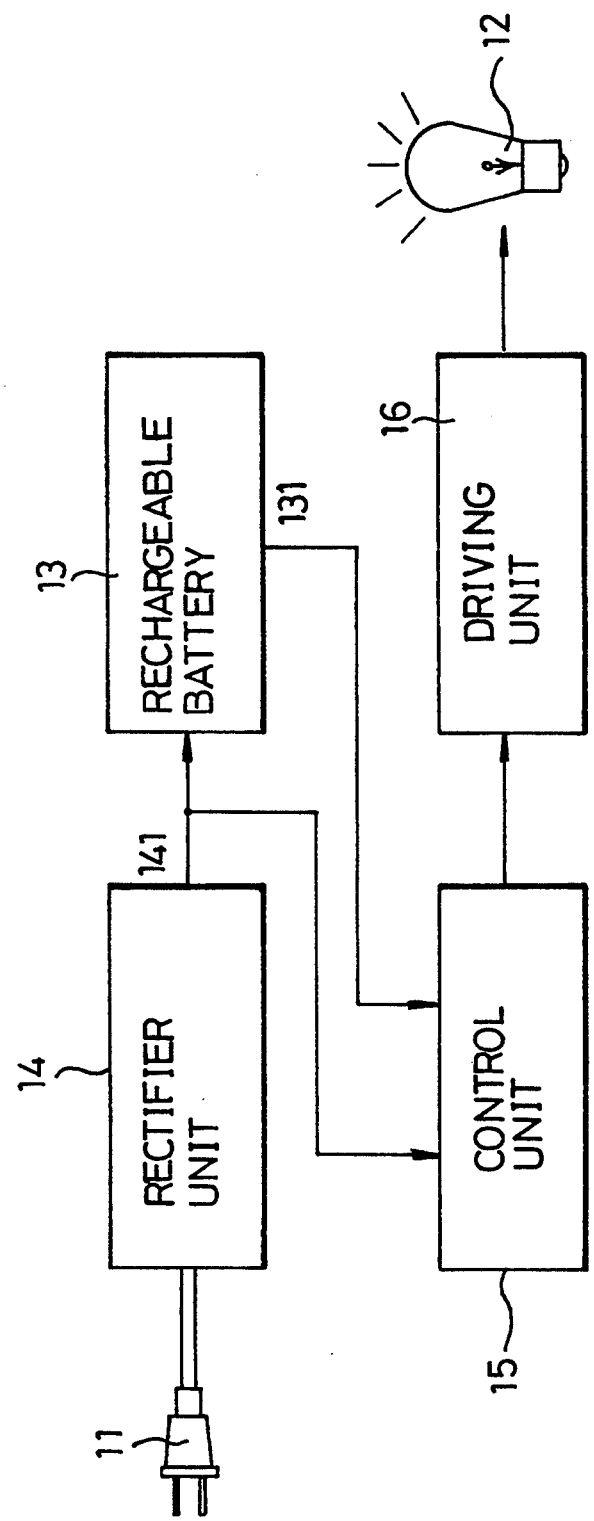
FIG. 2 is a schematic circuit block diagram of the conventional emergency lighting device.
Figure 3:
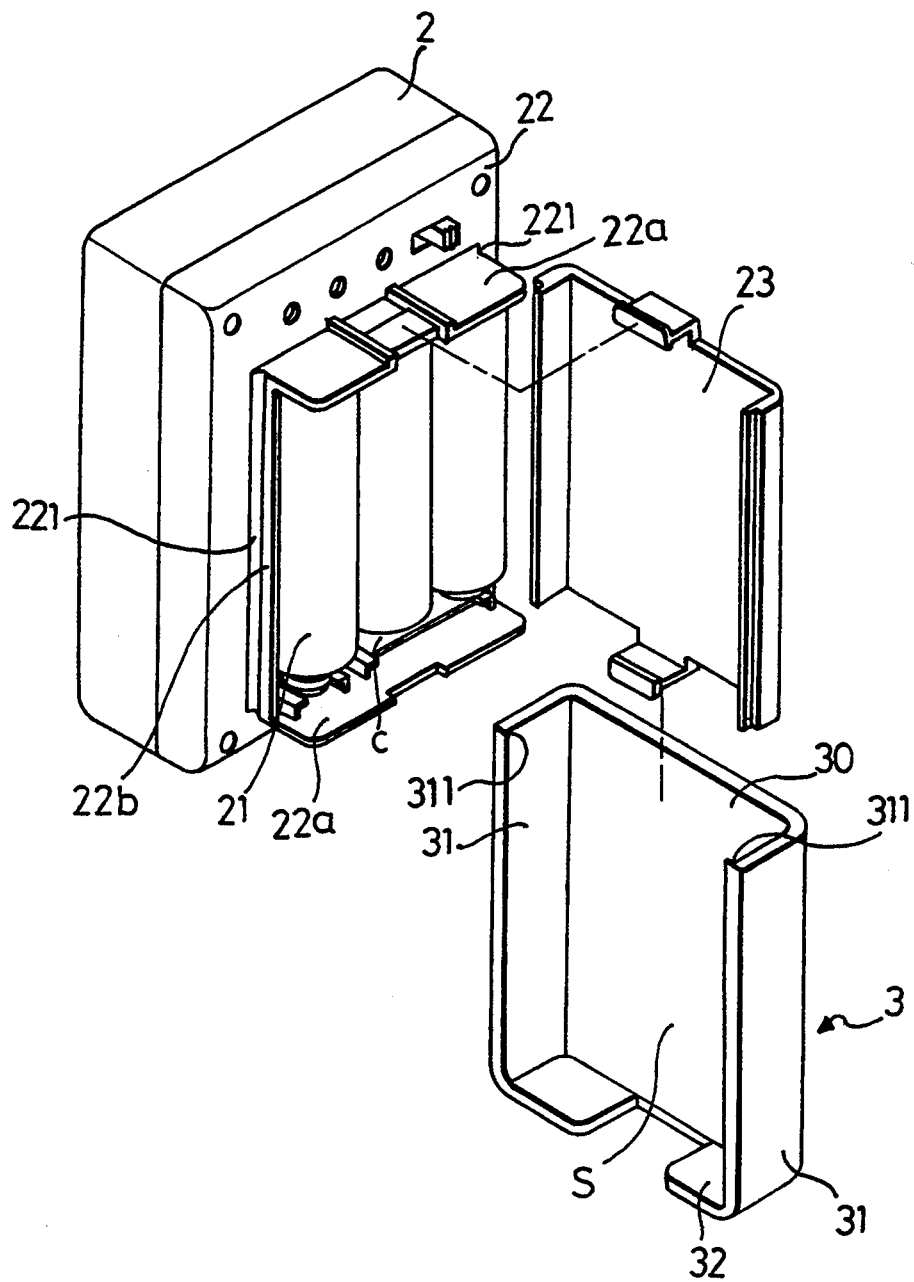
FIG. 3 is a partly exploded view showing an emergency lighting device according to the present invention.
Figure 4:
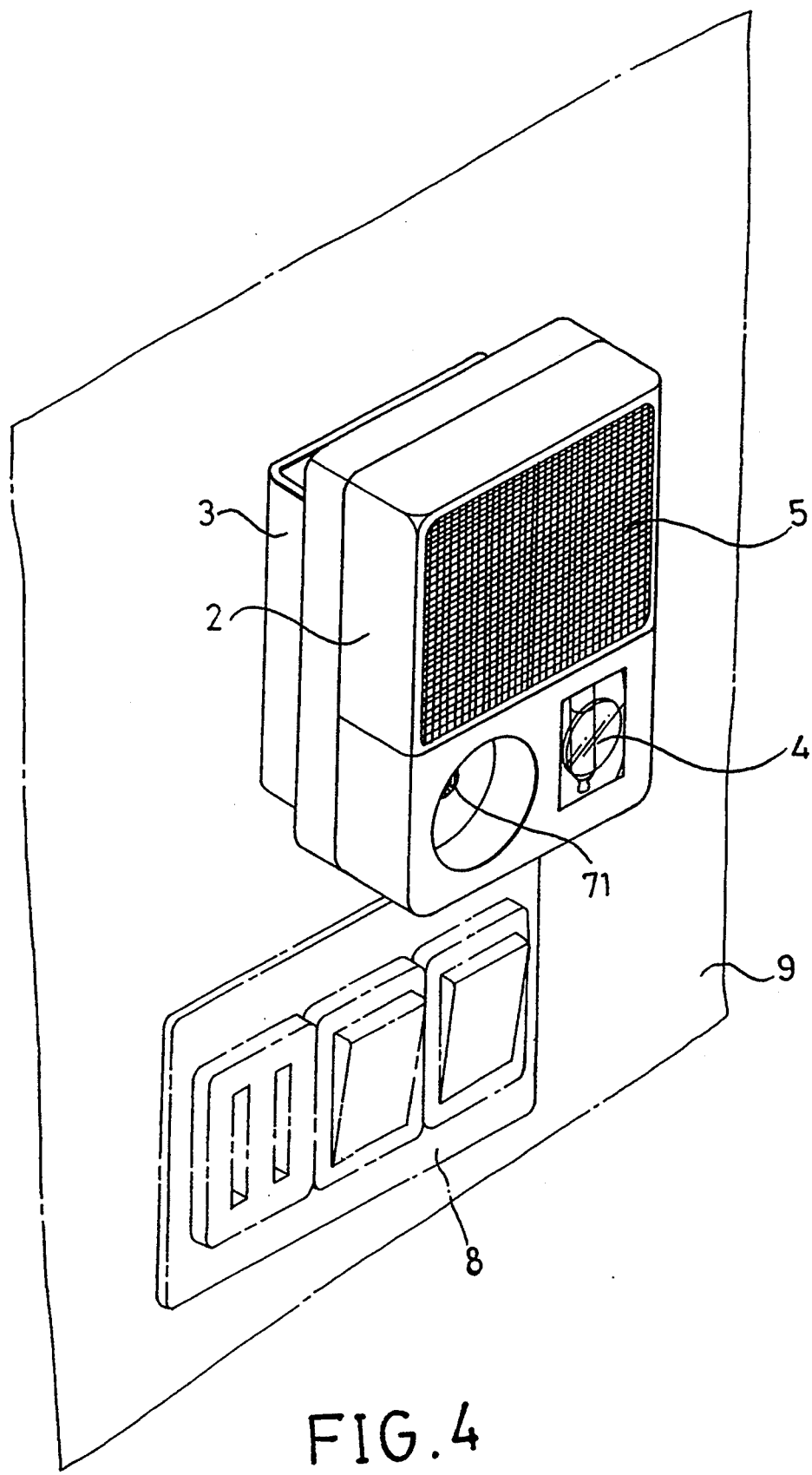
FIG. 4 is a perspective view of the emergency lighting device according to the present invention when in use.

Referring to FIGS. 3 and 4, an emergency lighting device according to this invention includes a hollow casing (2), a seat (3), a power supply unit, a magnetic field detecting unit, a lamp unit and a driving unit.

The hollow casing (2) has a rear surface (22). Two spaced horizontal plates (22a) and two spaced vertical plates (22b) extend outwardly from the rear surface of the casing (2). The vertical plates (22b) interconnect the horizontal plates (22a) in such a manner that the horizontal plates (22a) and the vertical plates (22b) cooperatively define a chamber (C) thereamong. Each of the vertical plates (22b) has a lengthwise guiding groove (221) formed in an outer surface thereof adjacent to the rear surface (22) of the casing (2). A cover (23) is mounted removably on the casing (2) and closes the chamber (22).

The seat (3) is formed from a vertical mounting plate (30) having two vertical sides and two opposed vertical positioning plates (31) which are connected securely to the sides of the mounting plate (30) and which are perpendicular to the mounting plate (30). Each of the positioning plates (31) has a stop extension (32) extending inwardly from the lowermost end thereof and a lengthwise guiding rib (311) projecting inwardly from one side which is away from the mounting plate (30). The positioning plates (31) and the stop extensions (32) cooperatively define a receiving space (S) thereamong for receiving removably the casing (2) such that the guiding grooves (221) engage the guiding ribs (311) and such that the lower horizontal plate (22a) rests on the stop extensions (32). The seat (3) can be mounted on a wall (9) or on a fixture (not shown) at a location adjacent to an electric outlet (8) by means of adhesive tape (not shown) or a locking bolt (not shown) which extends through the mounting plate (30) of the seat (3).

The magnetic field detecting unit (6) (see FIG. 5) is disposed inside the casing (2) and detects the absence of a magnetic field from the electric outlet (8).

The lamp unit includes a lamp (4) which is mounted on a front surface of the casing (2).

The driving unit is disposed inside the casing (2) and is connected electrically to the lamp unit and to the detecting unit (6). The driving unit includes a light-sensitive switch unit which has an exposed photoresistor (71). The driving unit is responsive to the detecting unit (6) so as to activate the lamp unit only when the magnetic field from the electric outlet (8) is absent and there is weak surrounding light.

The power supply assembly includes a rechargeable battery unit (21) for providing electric power to the emergency lighting device, and a solar energy converter unit which has a solar cell plate (5) mounted on the front surface of the casing (2) and which is connected operatively to the rechargeable battery unit (21) so as to convert solar energy into electric energy in order to charge the rechargeable battery unit (21).

Figure 5:
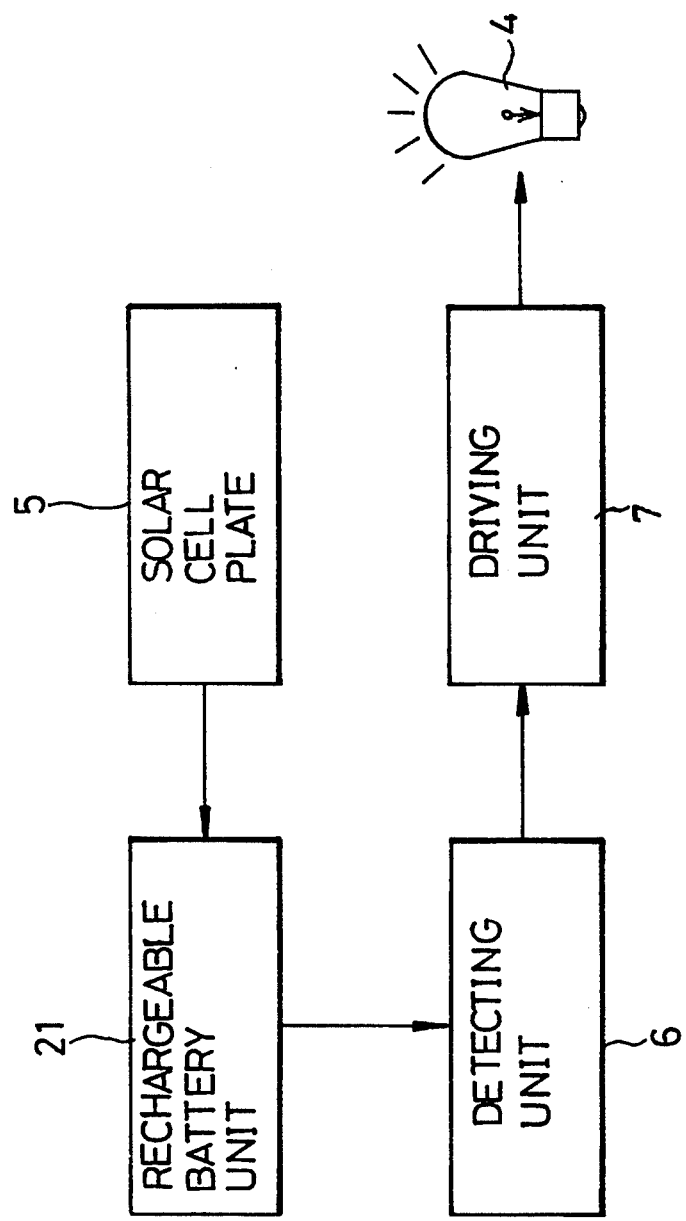
FIG. 5 is a schematic circuit block diagram of the emergency lighting device according to the present invention.
Figure 6:
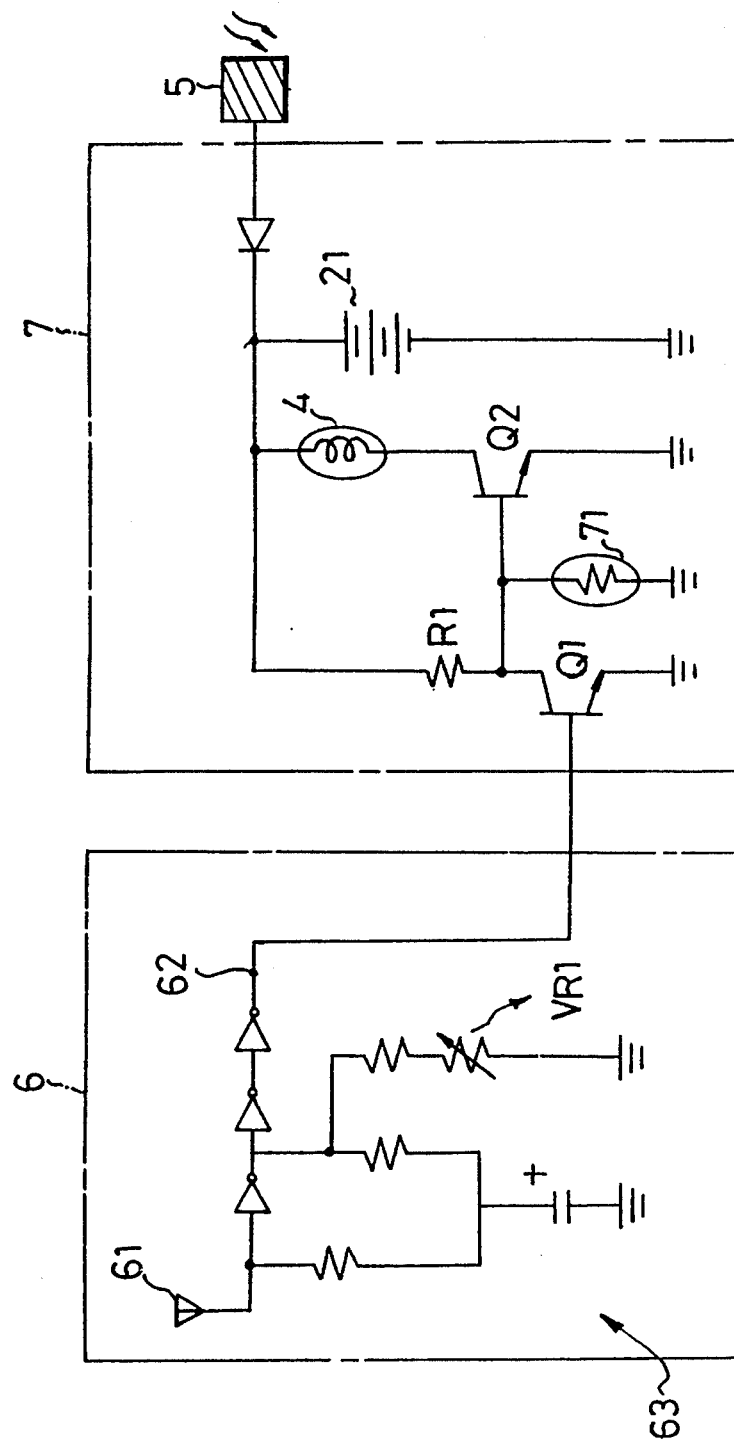
FIG. 6 is a schematic electrical circuit diagram of the emergency lighting device according to the present invention.

Referring to FIGS. 5 and 6, the detecting unit (6) includes a sensing plate (61) which is made of a metallic material, such as copper. The magnetic field sensing capability of the sensing plate (61) is proportional to the area of the sensing plate (61).

The sensing plate (61) serves as an input terminal of the detecting unit (6). The detecting unit (6) further has an output terminal (62) and an oscillating circuit (63) interconnecting the sensing plate (61) and the output terminal (62). The oscillating circuit (63) is designed to oscillate at a predetermined frequency which conforms to the alternating current line signal from the electric outlet (8). The frequency of the oscillating circuit (63) is variable by adjusting the value of a rheostat (VR1). The driving unit (7) includes a first transistor (Q1), a second transistor (Q2) and a resistor (R1). The first transistor (Q1) has a base terminal that is connected to the output terminal (62) of the detecting unit (6), a collector terminal that is connected electrically to a first terminal of the resistor (R1), and an emitter terminal which is grounded. The second transistor (Q2) has a base terminal that is connected electrically to the collector terminal of the first transistor (Q1) and to the first terminal of the resistor (R1), a collector terminal that is connected electrically to a first electrode of the lamp (4), and an emitter terminal which is grounded. The resistor (R1) has a second terminal that is connected electrically to a second electrode of the lamp (4) and to a first terminal of the rechargeable battery unit (21). The battery unit (21) has a second terminal which is grounded. The solar cell plate (5) is connected electrically to the first terminal of the battery unit (21) so as to absorb solar energy and convert the solar energy into electric energy in order to charge the battery unit (21). The photoresistor (71) has a first terminal that is connected electrically to the base terminal of the second transistor (Q2), and a second terminal which is grounded.

Referring once more to FIGS. 4, 5 and 6, in operation, the casing (2) is attached to the wall (9) adjacent to the electric outlet (8). During normal conditions, the detecting unit (6) detects the presence of the magnetic field from the electric outlet (8) via the sensing plate (61) so that the output at the output terminal (62) of the detecting unit (6) is high. A large bias voltage is provided to the base terminal of the first transistor (Q1), thereby causing the first transistor (Q1) to conduct. The base terminal of the second transistor (Q2) is grounded, thereby causing the second transistor (Q2) to cut-off. Hence, the battery unit (21) is precluded to supply the necessary power to activate the lamp (4). When a power outage occurs, the output at the output terminal (62) of the detecting unit (6) transits from high to low, thereby causing the first transistor (Q1) to cut off. When the resistance of the photoresistor (71) is at a relatively low value due to the presence of strong surrounding light, the voltage across the photoresistor (71) is relatively low when compared to the resistor (R1). Thus, the second transistor (Q2) is still cut-off due to the provision of an insufficient bias voltage, and the lamp (4) is still prevented from lighting. On the other hand, when the resistance of the photoresistor (71) is at a relatively high value due to the presence of weak surrounding light, the voltage across the photoresistor (71) is relatively high when compared to the resistor (R1) so that a large bias voltage is provided at the base terminal of the second transistor (Q2), thereby causing the second transistor (Q2) to conduct. At this stage, the battery unit (21) supplies the necessary power to activate the lamp (4).

Accordingly, the emergency lighting device according to the present invention can detect the occurrence of a power outage without the need for inserting a plug into an electric outlet so that the damage to the lighting device due to the presence of an electrical surge from the electric outlet immediately before the power outage can be prevented.

Referring once more to FIG. 4, since the casing (2) of the emergency lighting device according to the present invention is removable from the seat (3), the lighting device can serve as a flashlight for finding another lighting device which has a longer lighting time, such as candles.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An emergency lighting device, comprising:
    a hollow casing positioned adjacent to an electric outlet;
    a magnetic field detecting unit disposed inside said casing, said detecting unit detecting the absence of a magnetic field from said electric outlet;
    a lamp unit mounted operatively on said casing; and
    a driving unit disposed inside said casing and connected electrically to said lamp unit and said detecting unit, said driving unit including a light-sensitive switch unit and being responsive to said detecting unit so as to activate said lamp unit only when said magnetic field from said electric outlet is absent and there is weak surrounding light.

2. An emergency lighting device as claimed in claim 1, further comprising a power supply assembly installed operatively on said casing, said power supply assembly including a rechargeable battery unit for providing electric power to said emergency lighting device, and a solar energy converter unit which is connected operatively to said rechargeable battery unit so as to convert solar energy into electric energy in order to charge said rechargeable battery unit.

3. An emergency lighting device as claimed in claim 1, further comprising a seat which can be mounted on a predetermined position adjacent to said electric outlet and which has a receiving space for receiving removably said casing therein.

* * * * *